US012746158B2

(12) United States Patent
Parker

(10) Patent No.: US 12,746,158 B2
(45) Date of Patent: Sep. 29, 2026

(54) DUFFLE BAG STORAGE SYSTEM FOR USE ON AN EMERGENCY RESPONSE VEHICLE AND METHODS OF MAKING AND USING SAME

(71) Applicant: Ty Parker, Blairstown, NJ (US)

(72) Inventor: Ty Parker, Blairstown, NJ (US)

( * ) Notice: Subject to any disclaimer, the term of this patent is extended or adjusted under 35 U.S.C. 154(b) by 217 days.

(21) Appl. No.: 18/819,032

(22) Filed: Aug. 29, 2024

(65) Prior Publication Data

US 2026/0060856 A1 Mar. 5, 2026

(51) Int. Cl.
*A61G 3/00* (2006.01)

(52) U.S. Cl.
CPC .................................... *A61G 3/001* (2013.01)

(58) Field of Classification Search
CPC .................................. A61G 3/00; A61G 3/001
USPC ............................................................ 296/19
See application file for complete search history.

(56) References Cited

U.S. PATENT DOCUMENTS 4,911,296 A 3/1990 Hart, Jr.
5,785,372 A 7/1998 Glatzmeier et al.
5,897,154 A * 4/1999 Albertini ................ B60R 11/06 296/24.45
6,006,841 A 12/1999 Hunke
8,162,367 B2 * 4/2012 Kuklok ..................... B60R 9/00 296/3
9,713,977 B1 7/2017 Neal
9,902,329 B2 * 2/2018 Izydorek ................. B60R 9/055
2006/0125269 A1 * 6/2006 Kunz ................. A47B 21/0073 296/37.1
2019/0381346 A1 12/2019 Ienz, Jr. et al.
2021/0016716 A1 1/2021 Mcloughlin et al.
2022/0339476 A1 * 10/2022 Ziaylek .................. A62B 25/00
2023/0356662 A1 11/2023 Desai et al.

* cited by examiner

*Primary Examiner* — Steven O Douglas
(74) *Attorney, Agent, or Firm* — James R. McDaniel

(57) ABSTRACT

Systems, methods, and other embodiments for a duffle bag and/or line pack storage and retrieval system for use on an emergency response vehicle, including an emergency response vehicle, and a storage area operatively connected to one end of the emergency response vehicle, wherein the storage includes at least one duffle bag and/or line pack storage assembly which further includes at least one storage compartment, a plurality of slidable rails operatively connected to the at least one storage compartment, at least one slidable tray slidably connected to the plurality of slidable rails, at least one duffle bag and/or line pack located on the at least one slidable tray, and a security door located over the at least one storage compartment, wherein the security door secures and protects the duffle bag and/or line pack while the duffle bag and/or line pack is located on the at least one slidable tray and the at least one slidable tray is located within the at least one storage compartment.

20 Claims, 7 Drawing Sheets

DUFFLE BAG STORAGE SYSTEM FOR USE ON AN EMERGENCY RESPONSE VEHICLE AND METHODS OF MAKING AND USING SAME

FIELD OF THE INVENTION

The present invention is generally related to a duffle bag and/or line pack (back pack) storage system for use on an emergency response vehicle. In terms of emergency responders, a duffle bag is a type of travel bag that can be carried by the emergency responder. In particular, the duffle bag can be used to carry additional equipment, supplies, and/or personal gear that the emergency responder may need while the emergency responder is on the fire line or emergency response assignment. For example, a sleeping bag and compression sack, a sleeping pad, shelter such as a tent, extra clothing, and toiletries such as prescription medications, toothbrush, toothpaste, soap, a comb, shaving cream, razors, and other personnel hygiene items may be stored in the duffle bag and/or line pack (back pack).

BACKGROUND OF THE INVENTION

It is known that safety is the number one priority to all emergency responders. Second to that, due to the dangers of the job and the long duration of shifts, is convenience, accessibility, and ergonomics. Emergency responders are mandated, by all federal agencies, to carry line packs (backpacks) which contain the emergency responder's fire shelter and other necessary and mandatory equipment and supplies while on all emergency response assignments. The emergency responders can also use duffel bags to carry personnel equipment and supplies that can be used by the emergency responder while the emergency responder is staying at a camp or motel/hotel.

Prior to the present invention, emergency responders would just haphazardly store their duffle bag and/or line packs, with no consistency, in the truck cab, on the floor, on the back seat, or somewhere in the body compartments. In some instances, firefighters would store their packs in baskets on top of the truck. These packs would then be subjected to the elements such as sun and rain and even theft, while stopping during travel. Furthermore, additional vital equipment that may be stored in the line packs, such as radios, weather meters, and food, may be adversely affected because the line packs were not stored in a safe, secure, easily accessible location that is specifically designed to protect and store these duffle bags and/or line packs. Finally, quick access to these duffle bags and/or line packs is crucial! Therefore, it would be desirable if the line packs and/or duffle bags could be stored in a specific location that is also designed to provide for easy access to these line packs and/or duffle bags. It would also be desirable if the duffle bag and/or line packs or duffle bags could be stored in an organized, dry, secure, and protected location.

The preferred duffle bag storage system for use on an emergency response vehicle, according to various embodiments of the present invention, offers the following advantages: ease of use; quick access to the line packs and/or duffle bags, the ability to provide a dry, secure, and protected location to store the line packs and/or duffle bags, and the ability to store the line packs or duffle bags in a standardized location that is government agency specific on the emergency response vehicle. In fact, in many of the preferred embodiments, these advantages are optimized to an extent that is considerably higher than heretofore achieved in prior, known line pack and/or duffle bag storage and retrieval systems for use on emergency response vehicles.

It is a purpose of this invention to fulfill these and other needs in the line pack and/or duffle bag storage and retrieval systems for use on emergency response vehicles art in a manner more apparent to the skilled artisan once given the following disclosure.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

In order to address the shortcomings of the prior, known line pack and/or duffle bag storage and retrieval systems for use on emergency response vehicles, it would be desirable if the line packs and/or duffle bags could be stored in a specific location that is also designed to provide easy access to these duffle bags and/or line packs. It is important to note that the emergency responder has to wear his/her line pack whenever he/she is at a fire line so that he/she can quickly and easily don his/her firefighting equipment. It would also be desirable if the line packs and/or duffle bags could be stored in a dry, secure, and protected location. It is also important that the line pack and/or duffle bag storage and retrieval systems for use on emergency response vehicles utilize a standardized location to store the line packs or duffle bags that is government agency specific on the emergency response vehicle.

Referring now to FIGS. 1-6, there is illustrated line pack and/or duffle bag storage and retrieval system 2 for use on an emergency response. As will be explained hereinafter in greater detail, the line pack and/or duffle bag storage and retrieval system 2 will allow line packs and/or duffle bags to be stored in a specific location that is also designed to provide easy access to these duffle bags and/or line packs. Also, line pack and/or duffle bag storage and retrieval system 2 will allow the line packs and/or duffle bags to be stored in a dry, secure, and protected location. It is to be understood that the line pack and/or duffle bag storage and retrieval system 2 could also be used to store and protect emergency responder bags and equipment such as dive bags, high angle rescue equipment, storage containers and bags, hazmat equipment, storage containers and bags, and the like.

As shown in FIG. 1-6, there is illustrated line pack and/or duffle bag storage and retrieval system 2 which is constructed according to the present invention. In one embodiment, line pack and/or duffle bag storage and retrieval system 2 includes, in part, emergency response vehicle 4 and storage area 6 having line pack/duffle bag storage assemblies 50 and 100. In this manner, the line pack and/or duffle bag storage and retrieval system 2 allows the emergency responders to arrive at the fire line or emergency response assignment, exit the emergency response vehicle, and quickly and easily access their individual line packs and/or duffle bags.

Figure 1:
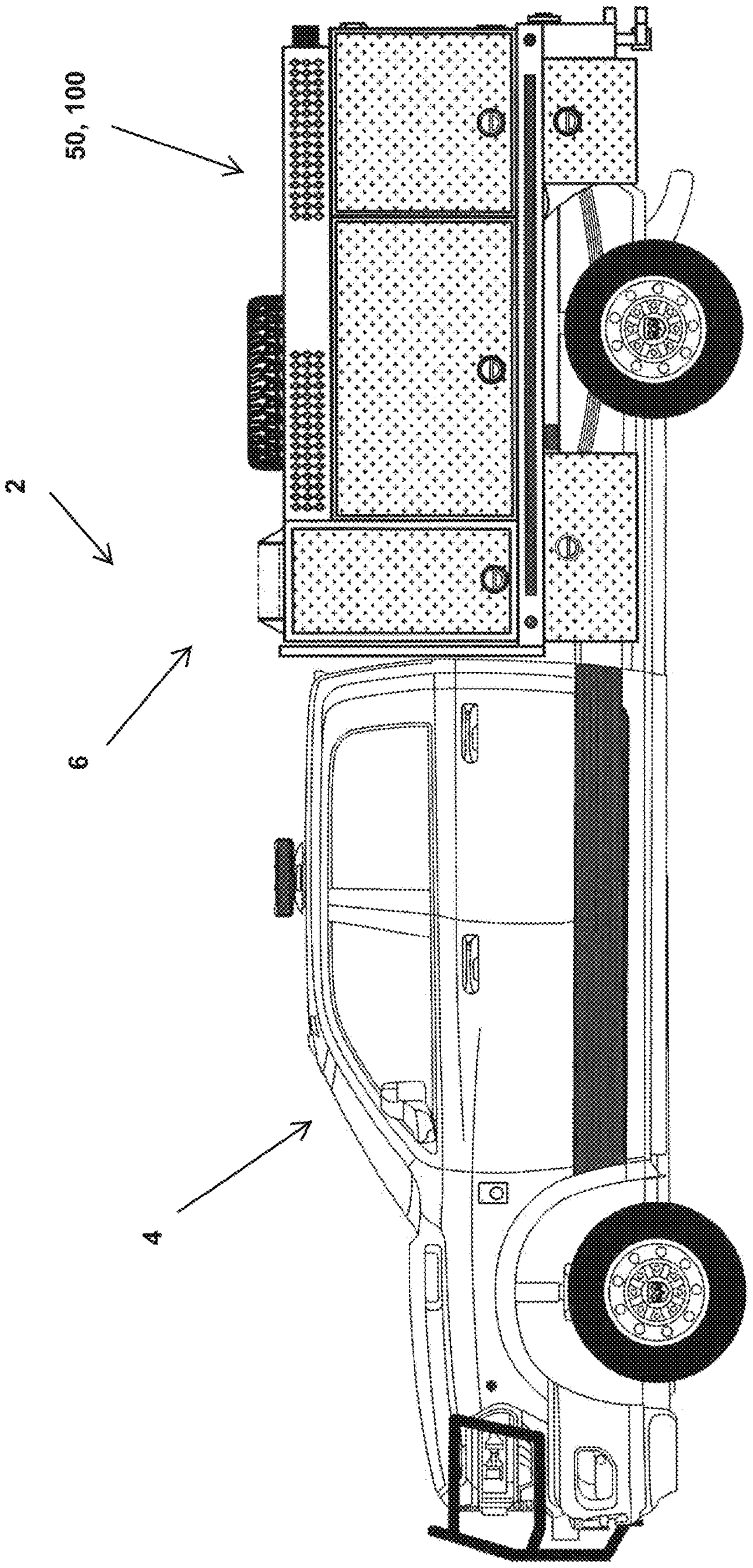
FIG. 1 is a side view of a duffle bag and/or line pack storage system for use on an emergency response vehicle, according to the present invention.
Figure 2:
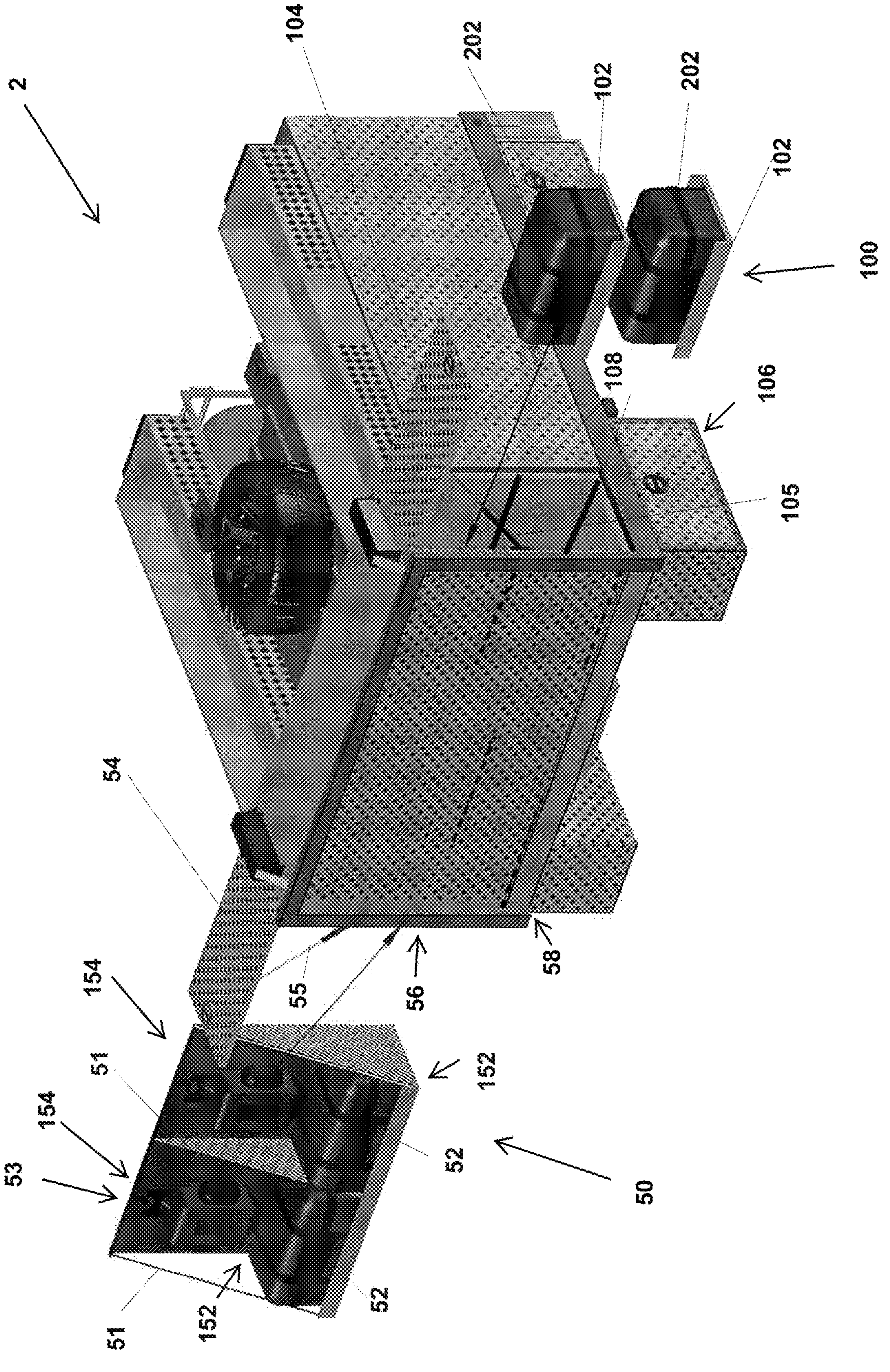
FIG. 2 is a rear, isometric view of the duffle bag and/or line pack storage system for use on an emergency response vehicle, according to the present invention.
Figure 3:
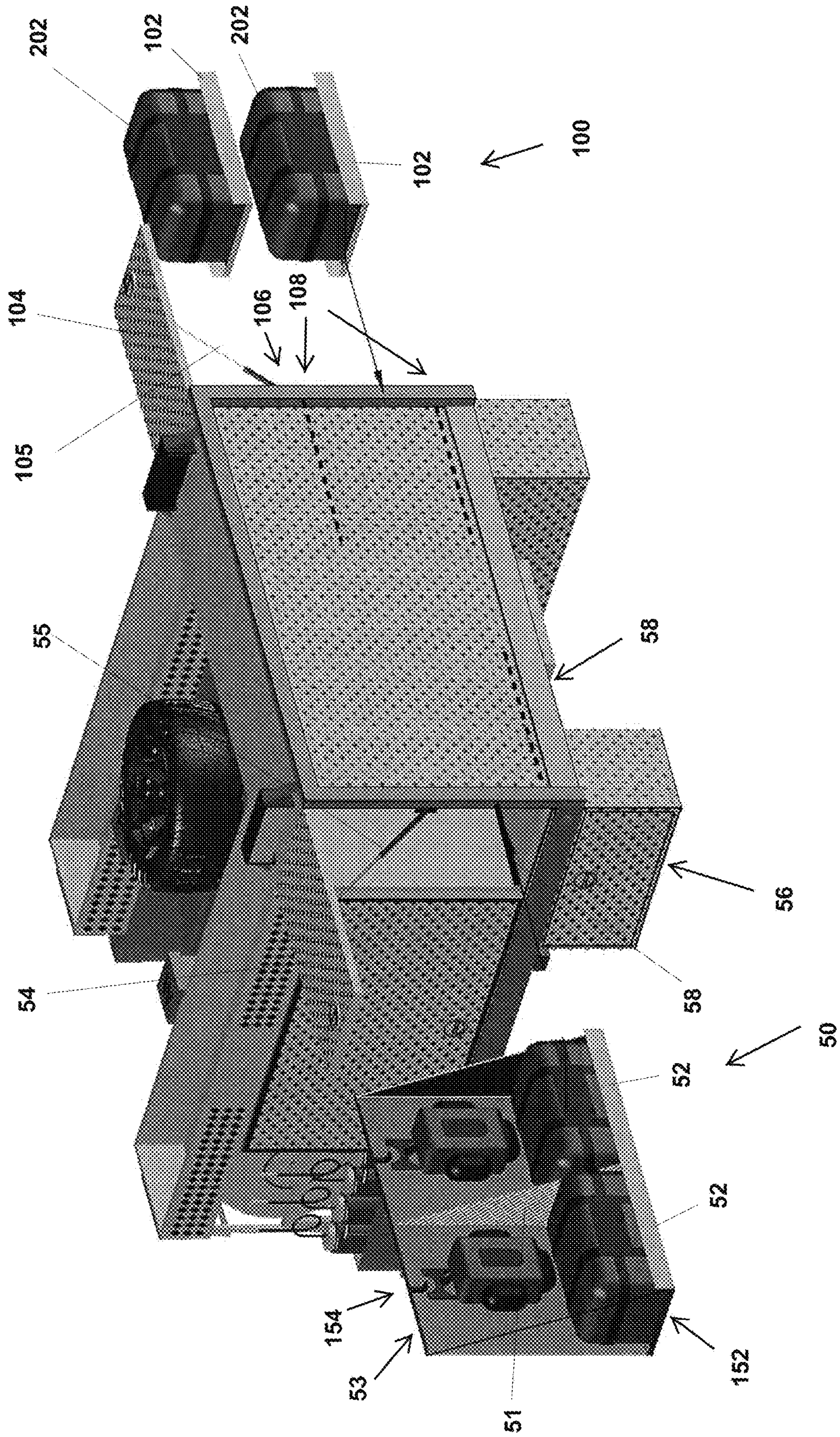
FIG. 3 is another rear, isometric view of the duffle bag and/or line pack storage system for use on an emergency response vehicle, according to the present invention.
Figure 5:
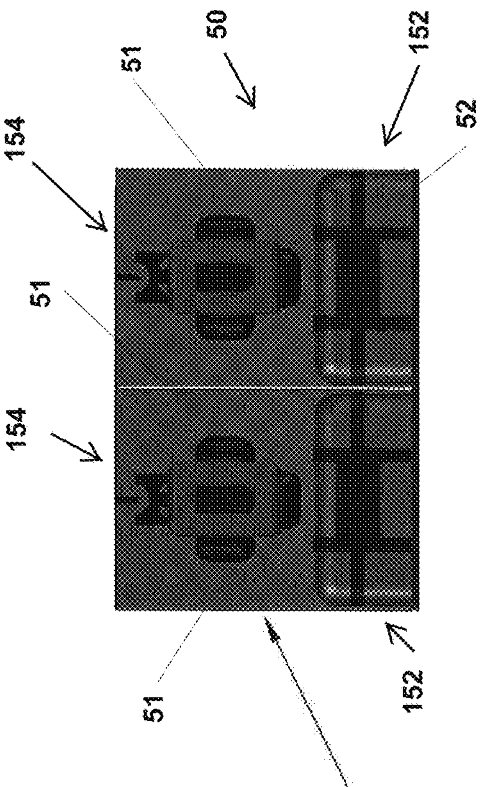
FIG. 5 is an expanded rear view of the passenger side drawer assembly of the duffle bag and/or line pack storage system for use on an emergency response taken from FIG. 4, according to the present invention.
Figure 6:
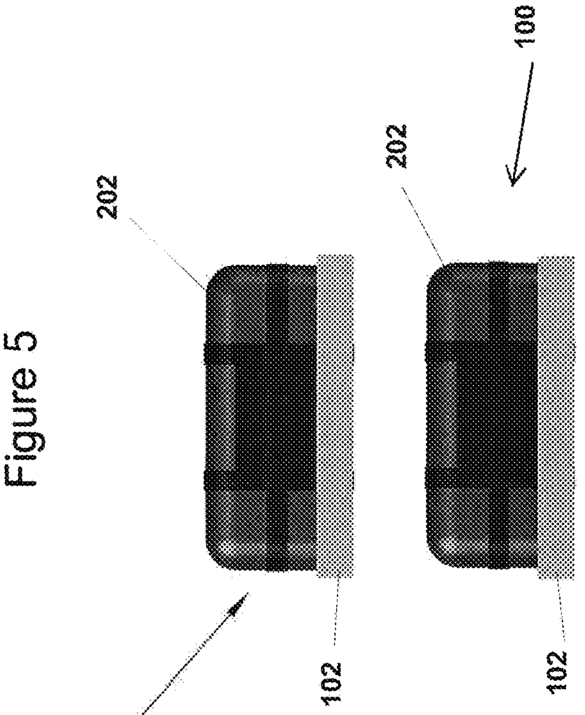
FIG. 6 is an expanded rear view of the driver side drawer assembly of the duffle bag and/or line pack storage system for use on an emergency response taken from FIG. 4, according to the present invention.
Figure 4:
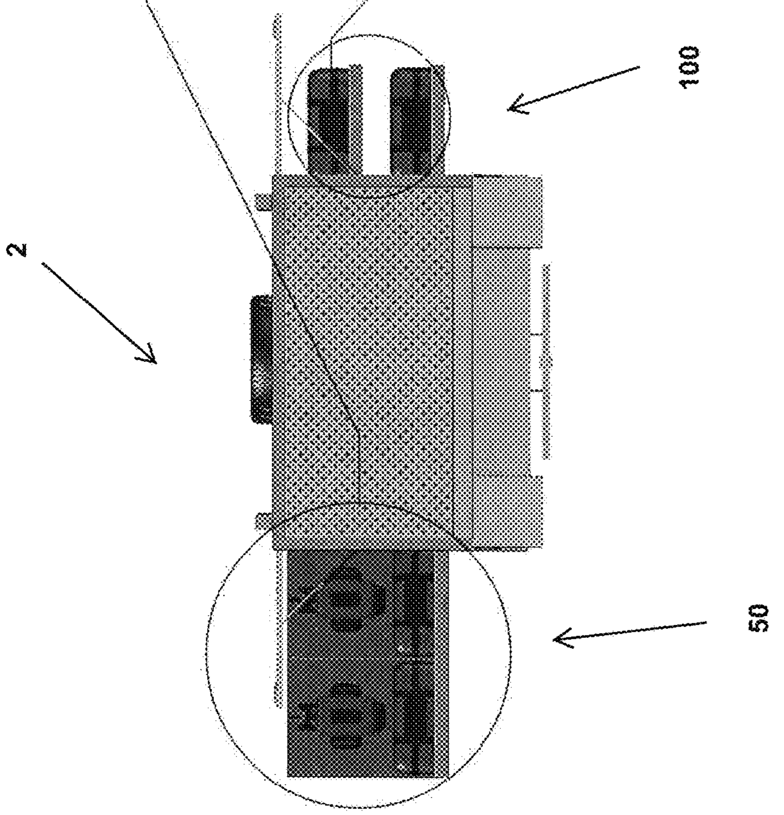
FIG. 4 is a rear view of the drawer assembly of the duffle bag and/or line pack storage system for use on an emergency response, according to the present invention.

With respect to line pack/duffle bag storage assemblies 50 and 100, attention is directed to FIGS. 2-6. As shown in FIGS. 2-6, in one embodiment, line pack/duffle bag storage assembly 50 includes, in part, slidable tray 52 with a mounting wall 51, lockable security door 54, storage compartment 56, and slidable rails 58 (FIG. 3). It is understood that slidable tray 52 with a mounting wall 51, lockable security door 54, and slidable rails 58 are constructed of any suitable high strength, rust resistant, UV resistant, heat resistant, and durable material. It is to be further understood that mounting wall 51 is attached to tray 52 by conventional techniques such as welding, fasteners, adhesives or the like. Furthermore, mounting wall 51 is used to provide a separation for separate areas 53.

A unique aspect of the present invention is the use of slidable tray 52 and slidable rails 58 (FIG. 3). Slidable tray 52 and mounting wall 51 should be constructed so that slidable tray 52 and mounting wall 51 are capable of securely retaining duffle bag 152 and line pack 154. It is to be understood that slidable tray 52 with a mounting wall 51 could also include an area for storage of hand tools for use by the emergency responder. Also, slidable tray 52 and mounting wall 51 should be constructed so that slidable tray 52 and mounting wall 51 are capable of sliding along slidable rails 58 so that the emergency responder can quickly and easily access the duffle bag 152 and the line pack 154. Furthermore, slidable rails 58 should be constructed so that slidable rails 58 are securely attached to the interior of storage compartment 56 by conventional fasteners (not shown) and still allow slidable tray 52 to slide along slidable rails 58.

Another unique aspect of the present invention is the use of lockable, security door 54. In particular, lockable, security door 54 will allow the emergency responder to safely and securely store his/her personal duffle bag 152 and line pack 154 on the slidable tray 52 within the storage compartment 56 without having to worry about that the emergency responder's belongings will be damaged or stolen. It is to be understood that security door 54 is to be located over the storage compartment 56 in order to secure within and protect any contents located within storage compartment 56. Furthermore, security door 54 is equipped with a door closer/opener 55 which is constructed so that it is capable of assisting in opening and closing the security door 54 (and 104). Also, the door closer/opener 54 is connected to the security door 54 (and 104) and the side of the storage compartment 56 (or 106, 256, 306, 356, or 556 depending upon the embodiment of the line pack and/or duffle bag storage and retrieval system 2) by conventional fasteners (not shown). Furthermore, door closer/opener 55 should be constructed so that it is capable of assisting in retaining the security door 54 in an open position so that the emergency responder can slide the slidable tray 52 outwardly and access the emergency responder's duffle bag 152 and the line pack 154. A still another unique aspect of the present invention is the use of slidable tray 52 and mounting wall 51. In particular, slidable tray 52 is divided into separate areas 53 through the use of mounting walls 51 where each emergency responder can store his/her own personal duffle bag 152 and line pack 154 on the slidable tray 52. In this manner, each emergency responder should be able to quickly and easily locate and remove his/her own personal duffle bag 152 and line pack 154 when needed. It is to be understood that each area 53 could be identified or marked to show that a particular emergency responder equipment is to be located in a particular area 53. For example, one area 53 could be marked/identified with the name "Smith" and another area 53 could be marked/identified with the name "Jones".

Another unique aspect of the present invention is the use of slidable tray 102 and slidable rails 108 (FIG. 2). Slidable tray mounting wall 102 should be constructed so that slidable tray 102 is capable of securely retaining duffle bag 202. Also, slidable tray 102 should be constructed so that slidable tray 102 is capable of sliding along slidable rails 108 so that the emergency responder can quickly and easily access the duffle bag 202. Furthermore, slidable rails 108 should be constructed so that slidable rails 108 are securely attached to the interior of storage compartment 106 using conventional fasteners (not shown) and still allow slidable tray 102 to slide along slidable rails 108.

Another unique aspect of the present invention is the use of lockable, security door 104. In particular, lockable security door 104 will allow the emergency responder to safely and securely store his/her personal duffle bag 152 on the slidable tray 102 within the storage compartment 106 without having to worry about that the emergency responder's belongings will be damaged or stolen. It is to be understood that security door 104 is to be located over the storage compartment 106 in order to secure within and protect any contents located within storage compartment 106. Furthermore, security door 104 is equipped with a door closer/opener 105 which is constructed so that it is capable of assisting in opening and closing the security door 104. Also, door closer/opener 105 should be constructed so that it is capable of assisting in retaining the security door 104 in an open position so that the emergency responder can slide the slidable tray 102 outwardly and access the emergency responder's duffle bag 152.

A still another unique aspect of the present invention is the use of slidable tray 102. In particular, in one embodiment, there are two (2) slidable trays 102 that can be used to allow a emergency responder to store his/her own personal duffle bag 202 on the slidable tray 102. In this manner, each emergency responder should be able to quickly and easily locate and remove his/her own personal duffle bag 202 when needed. It is to be understood that the two (2) slidable trays 52 and 102 allow for the emergency responders to quickly access their gear from the emergency response vehicle.

Figure 7:
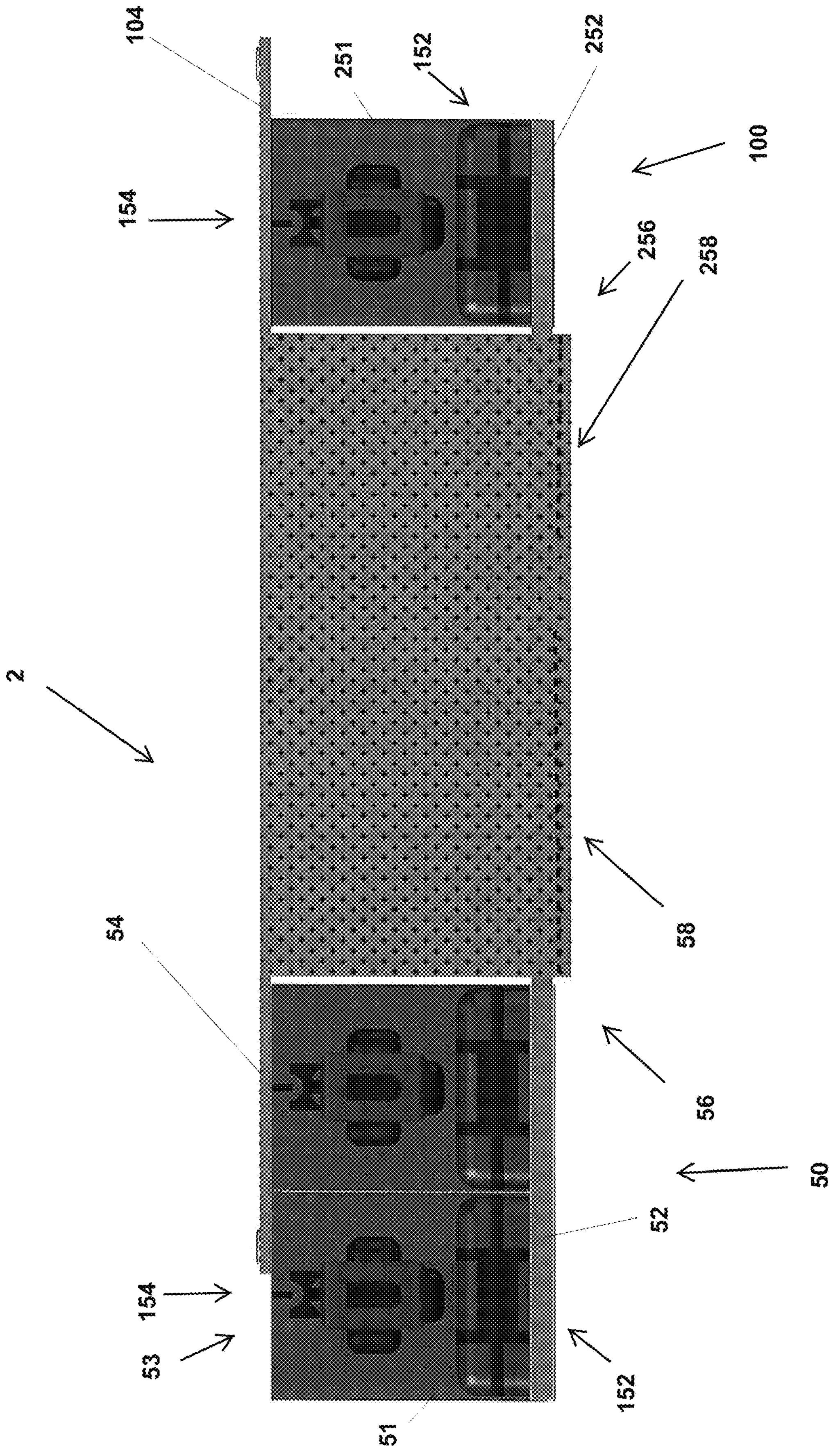
FIG. 7 is a rear view of a second embodiment of a drawer assembly of the duffle bag and/or line pack storage system for an emergency response, according to the present invention.

With respect to FIG. 7, there is illustrated another embodiment of the line pack and/or duffle bag storage and retrieval system 2. As shown in FIG. 7, this embodiment of the line pack and/or duffle bag storage and retrieval system 2 still includes the use of slidable tray 52 having a mounting wall 51, lockable security door 54, storage compartment 56, and slidable rails 58. Also, this embodiment of line pack and/or duffle bag storage and retrieval system 2 includes slidable tray 52 which is divided into separate areas 53 through the use of mounting walls 51 so that each emergency responder can store his/her own personal duffle bag 152 and line pack 154 on the slidable tray 52. In this manner, each emergency responder should be able to quickly and easily locate and remove his/her own personal duffle bag 152 and line pack 154 when needed.

A unique aspect of this embodiment of the line pack and/or duffle bag storage and retrieval system 2 is the use of slidable tray 252 having a mounting wall 251, lockable security door 104, storage compartment 256, and slidable rails 258. It is to be understood that slidable tray 252 is slidably connected to slidable rails 258 that are constructed in a similar manner to slidable rails 58. In this embodiment, slidable tray 252, lockable security door 104, storage compartment 256, and slidable rails 258 allow the emergency responder to safely and securely store a personal duffle bag 152 and to allow the emergency responder to quickly and easily access the personal duffle bag 152 when needed. In this manner, the slidable tray 252 having a mounting wall 251 provides a tray that allows the emergency responder to store his/her duffle bag and includes a wall to hang the emergency responder's back pack on.

Figure 8:
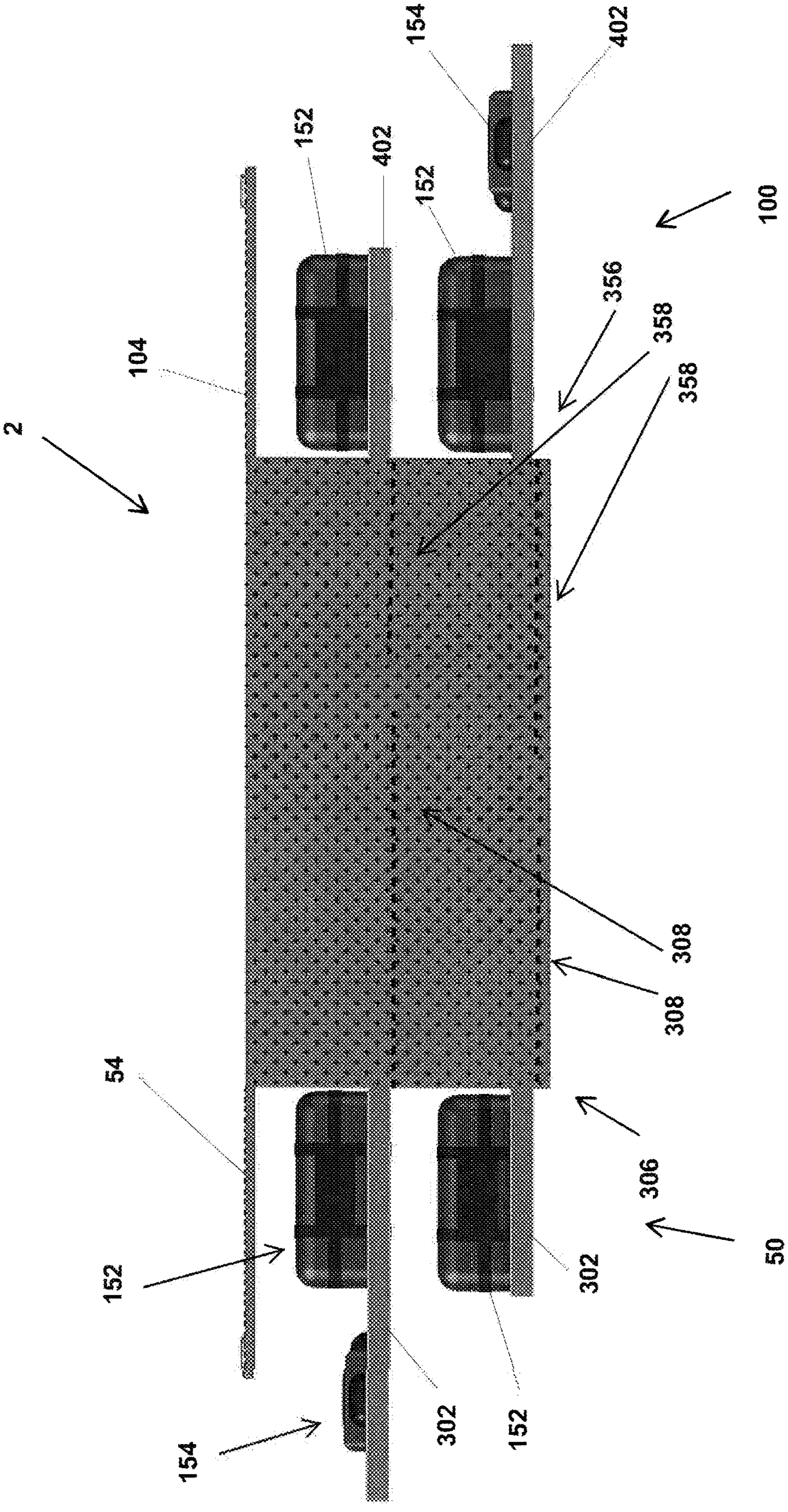
FIG. 8 is a rear view of a third embodiment of a drawer assembly of the duffle bag and/or line pack storage system for use on an emergency response, according to the present invention.

With respect to FIG. 8, there is illustrated another embodiment of the line pack and/or duffle bag storage and retrieval system 2. As shown in FIG. 8, this embodiment of the line pack and/or duffle bag storage and retrieval system 2 still includes the use of slidable tray 302 (and 402), lockable security door 54 (and 104), storage compartment 306 (and 356), and slidable rails 308 (and 358). Also, this embodiment of line pack and/or duffle bag storage and retrieval system 2 includes slidable tray 302 (and 402) in which each emergency responder can store his/her own personal duffle bag 152 and line pack 154 on the slidable tray 302 in a flat position. In this manner, each emergency responder should be able to quickly and easily locate and remove his/her own personal duffle bag 152 and line pack 154, when needed. It is to be understood that slidable trays 302 and 402 could be marked/identified so that a particular area on each slidable tray 302 and 402 is associated with a particular emergency responder.

A unique aspect of this embodiment of the line pack and/or duffle bag storage and retrieval system 2 is the use of slidable tray 302 (and 402), lockable security door 54 (and 104), storage compartment 306 (and 356), and slidable rails 308 (and 358). It is to be understood that slidable tray 302 (and 402) are slidably connected to slidable rails 308 (or 358) that are constructed in a similar manner to slidable rails 58. In this embodiment, slidable tray 302 (and 402), lockable security door 54 (and 104), storage compartment 306 (and 356), and slidable rails 308 (and 358) allow the emergency responder to safely and securely store a personal duffle bag 152 and line pack 154 and to allow the emergency responder to quickly and easily access the personal duffle bag 152 and line pack 154, when needed.

Figure 9:
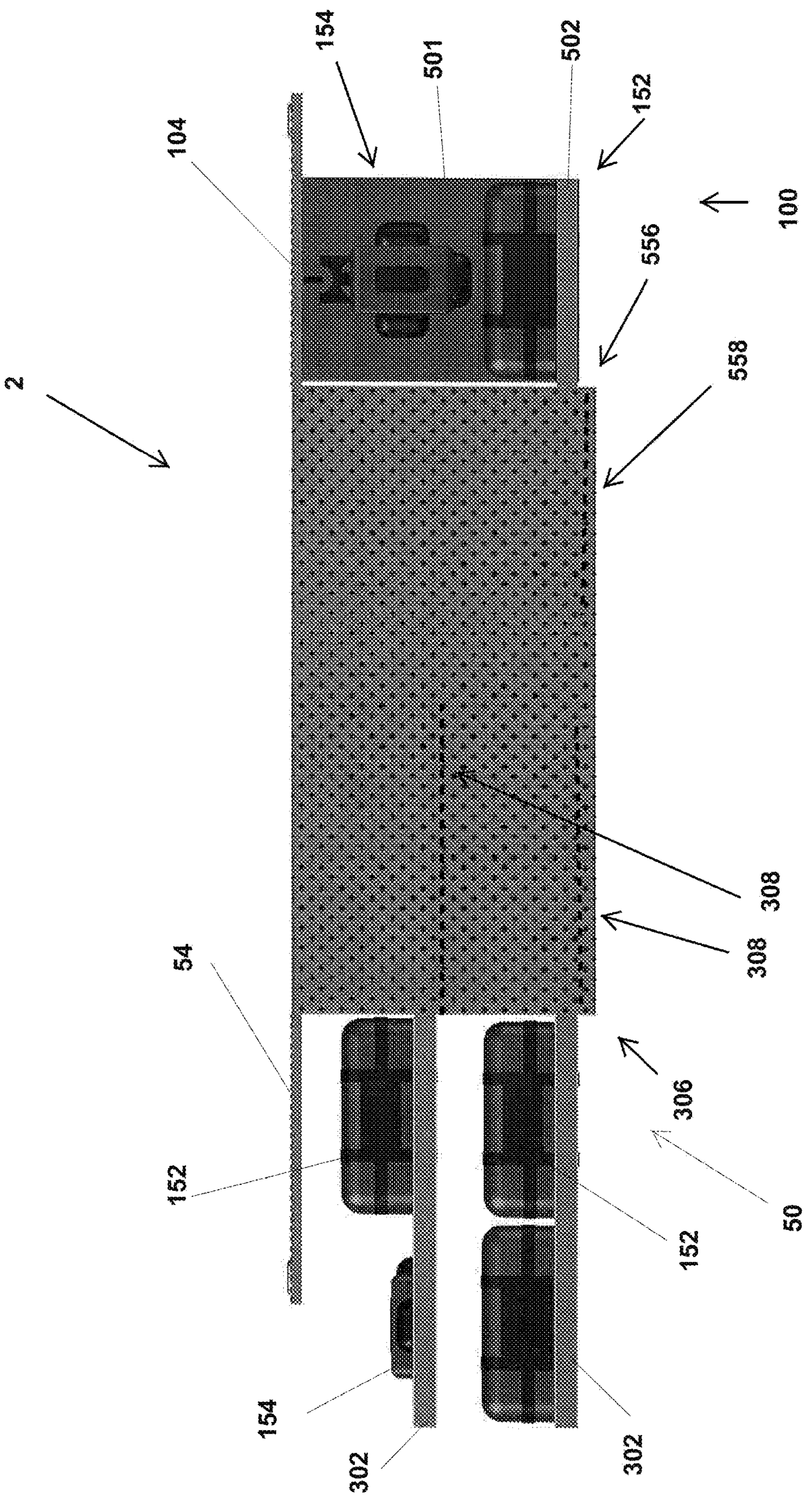
FIG. 9 is a rear view of a fourth embodiment of a drawer assembly of the duffle bag and/or line pack storage system for use on an emergency response, according to the present invention.

With respect to FIG. 9, there is illustrated another embodiment of the line pack and/or duffle bag storage and retrieval system 2. As shown in FIG. 9, this embodiment of the line pack and/or duffle bag storage and retrieval system 2 still includes the use of slidable tray 302 (and slidable tray 502 having a mounting wall 501), lockable security door 54 (and 104), storage compartment 306 (and 556), and slidable rails 308 (and 558). Also, this embodiment of line pack and/or duffle bag storage and retrieval system 2 includes slidable tray 302 in which each emergency responder can store his/her own personal duffle bag 152 and line pack 154 on the slidable tray 302 in a flat position. Also, slidable tray 502 with a mounting wall 501 is similar to slidable tray 252 with a mounting wall 251 (FIG. 7) such that each emergency responder can store his/her own personal duffle bag 152 and line pack 154 on the slidable tray 502. In this manner, each emergency responder should be able to quickly and easily locate and remove his/her own personal duffle bag 152 and line pack 154, when needed. It is to be understood that slidable trays 302 and 502 could be marked/identified so that a particular area on each slidable tray 302 and 502 is associated with a particular emergency responder.

A unique aspect of this embodiment of the line pack and/or duffle bag storage and retrieval system 2 is the use of slidable tray 302 (and 502), lockable security door 54 (and 104), storage compartment 306 (and 556), and slidable rails 308 (and 558). It is to be understood that slidable tray 302 (and 502) are slidably connected to slidable rails 308 (or 558) that are constructed in a similar manner to slidable rails 58. In this embodiment, slidable tray 302 (and 502), lockable security door 54 (and 104), storage compartment 306 (and 556), and slidable rails 308 (and 558) allow the emergency responder to safely and securely store a personal duffle bag 152 and line pack 154 and to allow the emergency responder to quickly and easily access the personal duffle bag 152 and line pack 154, when needed.

Using the Line Pack and/or Duffle Bag Storage and Retrieval System

With respect to using the line pack and/or duffle bag storage and retrieval system 2 so that the emergency responder can safely and securely store a personal duffle bag 152 and line pack 154 and then allow the emergency responder to quickly and easily access the personal duffle bag 152 and line pack 154, when needed, attention is directed to FIGS. 1-9. As discussed earlier, in order to use the line pack and/or duffle bag storage and retrieval system 2, the emergency responder needs to determine what equipment and supplies that the emergency responder may need while the emergency responder is on the fire line or emergency response assignment.

Once the nature of the equipment and supplies that the emergency responder may need while the emergency responder is on the fire line or emergency response assignment is determined, the emergency responder can then determine if the emergency responder will need to pack a personal duffle bag 152 and/or line pack 154.

Assuming that the emergency responder needs to pack both a personal duffle bag 152 and line pack 154, the emergency responder then proceeds to pack the personal duffle bag 152 and line pack 154 with the needed equipment and supplies that the emergency responder may need while the emergency responder is on the fire line or emergency response assignment.

After the emergency responder packs the needed equipment and supplies in the personal duffle bag 152 and line pack 154, the emergency responder transports the personal duffle bag 152 and line pack 154 to the emergency vehicle 4 that is equipped with the line pack and/or duffle bag storage and retrieval system 2 on the storage area 6 of the emergency vehicle 2.

Depending upon the layout of the line pack and/or duffle bag storage and retrieval system 2 on the storage area 6 on the emergency response vehicle 4, the emergency responder proceeds to unlock the doors 54 and 104. The emergency responder then pulls on the slidable tray 52 (or 102, 252, 302, 402 or 502) outwardly away from the storage compartment 56 (or 106, 256, 306, 356, or 556 depending upon the embodiment of the line pack and/or duffle bag storage and retrieval system 2). The emergency responder is then able to determine where the emergency responder is supposed to store his/her personal duffle bag 152 and line pack 154. As discussed above, each area 53 should be marked/identified with the name of the emergency responder so the emergency responder knows where to store his/her personal duffle bag 152 and line pack 154.

The emergency responder then proceeds to locate a designated open area 53 where each emergency responder can store his/her own personal duffle bag 152 and line pack 154 on the slidable tray 52 (or 102, 252, 302, 402 or 502). Once the personal duffle bag 152 and line pack 154 are stored on the slidable tray, the slidable tray 52 (or 102, 252, 302, 402 or 502) is then slid inwardly into the storage compartment 56 (or 106, 256, 306, 356, or 556 depending upon the embodiment of the line pack and/or duffle bag storage and retrieval system 2). The emergency responder can then lower the door 54 or 104 and securely lock the door 54 or 104. In this manner, each emergency responder should be able to safely and securely store his/her own personal duffle bag 152 and line pack 154.

Upon reaching the fire line or emergency response assignment, the emergency responder unlocks the door 54 or 104, pulls out the slidable tray along the slidable rails from the storage compartment 56 (or 106, 256, 306, 356, or 556 depending upon the embodiment of the line pack and/or duffle bag storage and retrieval system 2), and retrieves his/her own personal duffle bag 152 and line pack 154 from his/her designated area 53. In this manner, the emergency responder can quickly and easily access his/her own personal duffle bag 152 and line pack 154 from the slidable tray.

After the emergency responder has retrieved his/her own personal duffle bag 152 and line pack 154, the emergency responder can slide the slidable tray back into the storage compartment 56 (or 106, 256, 306, 356, or 556 depending upon the embodiment of the line pack and/or duffle bag storage and retrieval system 2). The emergency responder can then close the door 54 or 104 and lock the door 54 or 104.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be consideduffle part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein are a new and improved duffle bag storage system for use on an emergency response vehicle. The preferred duffle bag storage system for use on an emergency response vehicle, according to various embodiments of the present invention, offers the following advantages: ease of use; quick access to the duffle bags and/or line packs, the ability to provide a dry, secure, and protected location to store the duffle bags and/or line packs, and the ability to store the duffle bags and/or line packs in a specific location on the emergency response vehicle. In fact, in many of the preferred embodiments, these advantages are optimized to an extent that is considerably higher than heretofore achieved in prior, known line pack and/or duffle bag storage and retrieval systems for use on emergency response vehicles.

I claim:

1. A duffle bag, line pack storage and retrieval system for use on an emergency response vehicle, comprising:
- an emergency response vehicle; and
- a storage area operatively connected to one end of the emergency response vehicle, wherein the storage includes at least one duffle bag, line pack storage assembly, and wherein the at least one duffle bag, line pack storage assembly further comprises,
  - at least one storage compartment,
  - a plurality of slidable rails operatively connected to the at least one storage compartment,
  - at least one slidable tray slidably connected to the plurality of slidable rails,
  - at least one line pack located on the at least one slidable tray, and
  - a security door located over the at least one storage compartment, wherein the security door is configured to secure and protect the line pack while the line pack is located on the at least one slidable tray and the at least one slidable tray is located within the at least one storage compartment.

2. The duffle bag, line pack storage and retrieval system, according to claim 1, wherein the duffle bag, line pack storage and retrieval system is further comprised of:
- at least one duffle bag located on the least one slidable tray.

3. The duffle bag, line pack storage and retrieval system, according to claim 1, wherein the security door is further comprised of:
- a door closer/opener operatively connected to the security door and the at least one storage compartment.

4. The duffle bag, line pack storage and retrieval system, according to claim 1, wherein the security door is further comprised of:
- a lockable security door.

5. The duffle bag, line pack storage and retrieval system, according to claim 1, wherein the at least one line pack is configured to store additional equipment and supplies that an emergency responder may need while the emergency responder is on an emergency response assignment.

6. The duffle bag, line pack storage and retrieval system, according to claim 2, wherein the at least one duffle bag is configured to store additional equipment and supplies that a emergency responder may need while the emergency responder is on an emergency response assignment.

7. The duffle bag, line pack storage and retrieval system, according to claim 1, wherein the at least one slidable tray further comprises:

at least one mounting wall operatively connected to the at least one slidable tray.

8. A method of constructing a duffle bag, line pack storage and retrieval system for use on an emergency response vehicle, comprising:

providing an emergency response vehicle; and attaching a storage area to one end of the emergency response vehicle, wherein the storage area includes at least one duffle bag, line pack storage assembly, and wherein the at least one duffle bag, line pack storage assembly further comprises, at least one storage compartment, a plurality of slidable rails operatively connected to the at least one storage compartment, at least one slidable tray slidably connected to the plurality of slidable rails, at least one line pack located on the at least one slidable tray, and a security door located over the at least one storage compartment, wherein the security door is configured to secure and protect the line pack while the line pack is located on the at least one slidable tray and the at least one slidable tray is located within the at least one storage compartment.

9. The method, according to claim 8, wherein the method is further comprised of:

locating at least one storage case on the least one slidable tray.

10. The method, according to claim 8, wherein the method is further comprised of:

attaching a door closer/opener to the security door and the at least one storage compartment.

11. The method, according to claim 8, wherein the security door is further comprised of:

a lockable security door.

12. The method, according to claim 8, wherein the at least one line pack is configured to store additional equipment and supplies that an emergency responder may need while the emergency responder is on an emergency response assignment.

13. The method, according to claim 9, wherein the at least one duffle bag is configured to store additional equipment and supplies that an emergency responder may need while the emergency responder is on an emergency response assignment.

14. The method, according to claim 8, wherein the at least one slidable tray slidable tray further comprises:

a mounting wall operatively connected to the at least one slidable tray.

15. A method of using a duffle bag, line pack storage and retrieval system located on an emergency response vehicle, comprising:

providing an emergency response vehicle;

attaching a storage area to one end of the emergency response vehicle, wherein the storage area includes at least one duffle bag, line pack storage assembly, and wherein the at least one duffle bag, line pack storage assembly further comprises, at least one storage compartment, a plurality of slidable rails operatively connected to the at least one storage compartment, at least one slidable tray having a mounting wall slidably connected to the plurality of slidable rails, at least one line pack located on the at least one slidable tray with a mounting wall, and a security door located over the at least one storage compartment, wherein the security door is configured to secure and protect the line pack while the line pack is located on the at least one slidable tray with a mounting wall and the at least one slidable tray with a mounting wall is located within the at least one storage compartment;

opening the security door;

pulling the at least one slidable tray with a mounting wall outwardly along the plurality of slidable rails;

storing the at least one line pack on the slidable tray with a mounting wall;

sliding the at least one slidable tray with a mounting wall inwardly into the storage compartment; and closing the security door.

16. The method, according to claim 15, wherein the method is further comprised of:

locating at least one storage case on the least one slidable tray with a mounting wall.

17. The method, according to claim 15, wherein the method is further comprised of:

attaching a door closer/opener to the security door and the at least one storage compartment, wherein the door closer/opener is configured to allow the security door to remain open and to assist in closing the security door.

18. The method, according to claim 15, wherein the security door is further comprised of:

providing the security door with a lock, wherein the security door can be locked after the security door is closed.

19. The method, according to claim 15, wherein the at least one line pack is configured to store additional equipment and supplies that an emergency responder may need while the emergency responder is on an emergency response assignment.

20. The method, according to claim 15, wherein the at least one slidable tray slidable tray further comprises:

a mounting wall operatively connected to the at least one slidable tray.

* * * * *